(12) United States Patent
Hsieh et al.

(10) Patent No.: US 10,592,026 B2
(45) Date of Patent: Mar. 17, 2020

(54) TOUCH PANEL

(71) Applicant: Au Optronics Corporation, Hsinchu (TW)

(72) Inventors: Yu-Hsin Hsieh, Nantou County (TW); Zeng-De Chen, Yunlin County (TW)

(73) Assignee: Au Optronics Corporation, Hsinchu (TW)

( * ) Notice: Subject to any disclaimer, the term of this patent is extended or adjusted under 35 U.S.C. 154(b) by 19 days.

(21) Appl. No.: 15/694,861

(22) Filed: Sep. 4, 2017

(65) Prior Publication Data
US 2018/0356924 A1 Dec. 13, 2018

(30) Foreign Application Priority Data
Jun. 8, 2017 (TW) .............................. 106119076 A

(51) Int. Cl.
*G06F 3/041* (2006.01)
*G02F 1/1333* (2006.01)
*G02F 1/1343* (2006.01)
*G02F 1/1345* (2006.01)
(Continued)

(52) U.S. Cl.
CPC ........ *G06F 3/0412* (2013.01); *G02F 1/13338* (2013.01); *G02F 1/13458* (2013.01); *G02F 1/133345* (2013.01); *G02F 1/134363* (2013.01); *G02F 1/136209* (2013.01); *G02F 1/136227* (2013.01); *G02F 1/136286* (2013.01); *G02F 2001/13685* (2013.01); *G02F 2001/134372* (2013.01); *G02F 2201/122* (2013.01); *G02F 2201/123* (2013.01); *G06F 2203/04107* (2013.01); *G06F 2203/04111* (2013.01)

(58) Field of Classification Search
CPC ........ G06F 3/0412; G06F 2203/04107; G06F 2203/04111; G02F 1/133345; G02F 1/13338; G02F 1/13458; G02F 1/136209; G02F 1/136227
See application file for complete search history.

(56) References Cited

U.S. PATENT DOCUMENTS

2016/0109998 A1* 4/2016 Watanabe ............. G06F 3/0412
349/12
2016/0147346 A1 5/2016 Lee et al.
(Continued)

FOREIGN PATENT DOCUMENTS

| CN | 103135830 | 6/2013 |
|---|---|---|
| CN | 103278955 | 9/2013 |
| CN | 103365509 | 10/2013 |

(Continued)

OTHER PUBLICATIONS

"Office Action of Taiwan Counterpart Application," dated Dec. 28, 2017, p. 1-p. 5, in which the listed reference was cited.

*Primary Examiner* — Lixi C Simpson
(74) *Attorney, Agent, or Firm* — JCIPRNET

(57) ABSTRACT

A touch panel including a first substrate, a plurality of touch electrodes and a plurality of active components is provided. The first substrate has an active region. The touch electrodes are disposed on the active region. Each of the touch electrodes includes a network structure having a solid portion and a plurality of opening portions defined by the solid portion. Each of the active components includes a semiconductor pattern substantially shielded by the solid portion of one corresponding touch electrode.

26 Claims, 7 Drawing Sheets

(51) Int. Cl.
    *G02F 1/1362* (2006.01)
    *G02F 1/1368* (2006.01)

(56) References Cited

U.S. PATENT DOCUMENTS

2016/0240560 A1\* 8/2016 Lin ...................... G06F 3/0412
2018/0188614 A1\* 7/2018 Yeh ................... G02F 1/134309

FOREIGN PATENT DOCUMENTS

| | | |
|---|---|---|
| CN | 103677475 | 3/2014 |
| CN | 105183220 | 12/2015 |
| TW | 201619789 | 6/2016 |
| TW | 201706796 | 2/2017 |
| TW | 201712508 | 4/2017 |

\* cited by examiner

TOUCH PANEL

CROSS-REFERENCE TO RELATED APPLICATION

This application claims the priority benefit of Taiwan application serial no. 106119076, filed on Jun. 8, 2017. The entirety of the above-mentioned patent application is hereby incorporated by reference herein and made a part of this specification.

BACKGROUND OF THE INVENTION

Field of the Invention

The invention relates to a touch panel, and particularly relates to an in-cell touch display panel.

Description of Related Art

In-cell touch display panel is currently a touch display panel with high integration and smaller thickness, in which touch electrodes are fabricated in a display panel. Regarding a general display panel, an indium tin oxide layer may be configured on a substrate located adjacent to a touch surface to provide an extra voltage difference, so as to change a rotating direction of a display medium to achieve viewing angle control (VAC), for example, the technique disclosed in Taiwan patent application No. 105115700.

SUMMARY OF THE INVENTION

The invention is directed to a touch panel, which has a good performance.

An embodiment of the invention provides a touch panel including a first substrate, a plurality of touch electrodes and a plurality of active components. The first substrate has an active region. The touch electrodes are disposed on the active region of the first substrate. Each of the touch electrodes includes a network structure, where the network structure has a solid portion and a plurality of opening portions defined by the solid portion. Each of the active components includes a semiconductor pattern, where the semiconductor pattern is substantially shielded by the solid portion of one corresponding touch electrode.

In an embodiment of the invention, the touch panel further includes a first insulation layer, a second insulation layer and a plurality of pixel electrodes. The first insulation layer is located on the first substrate and the touch electrodes, and the active components are disposed on the first insulation layer. The second insulation layer is disposed on the active components. The pixel electrodes are respectively and electrically connected to the active components, where each of the pixel electrodes is overlapped with at least one opening portion of one corresponding touch electrode.

In an embodiment of the invention, the touch panel further includes a second substrate and a display medium. The second substrate is disposed opposite to the first substrate. The display medium is disposed between the pixel electrodes and the second substrate, where the touch electrodes and the active components are located between the first substrate and the display medium.

In an embodiment of the invention, the touch panel further includes a conductive layer disposed between the second substrate and the display medium.

In an embodiment of the invention, the touch panel further includes a plurality of touch signal lines and a third insulation layer. The touch signal lines are disposed on the first insulation layer and are respectively and electrically connected to the touch electrodes. The third insulation layer is disposed on the touch signal lines, where the active components are disposed on the first insulation layer and the third insulation layer stacked with each other.

In an embodiment of the invention, the third insulation layer has a first contact via disposed on the touch signal line and a second contact via disposed outside the touch signal line. The first insulation layer has a third contact via overlapped and connected with the second contact via. Moreover, the touch panel further includes a conductive pattern disposed on the third insulation layer. The conductive pattern is electrically connected between the touch signal line and the touch electrode through the first contact via, the second contact via and the third contact via.

In an embodiment of the invention, each of the active components further includes a source, a gate, a gate insulation layer and a drain. The gate insulation layer is disposed between the gate and the semiconductor pattern and covers the third insulation layer.

In an embodiment of the invention, the gate and the conductive pattern are constructed from a same film layer.

In an embodiment of the invention, the touch panel further includes an intermediate dielectric layer and a conductive pattern. The intermediate dielectric layer covers the gate and has a fourth contact via and a fifth contact via, where the source and the drain are disposed on the intermediate dielectric layer and are respectively and electrically connected to the semiconductor pattern through the fourth contact via and the fifth contact via. The conductive pattern is disposed on the intermediate dielectric layer, and is electrically connected between one of the touch electrodes and one touch signal line.

In an embodiment of the invention, the first substrate further has a periphery region outside the active region. A first end of each of the touch signal lines is electrically connected to one corresponding touch electrode, and a second end of each of the touch signal lines is located on the periphery region. Moreover, the touch panel further includes a transfer pattern and a pad. The transfer pattern is located on the periphery region and is disposed on the third insulation layer. The transfer pattern is electrically connected to one of the touch signal lines. The pad is disposed on the second insulation layer and is electrically connected to the one of the touch signal lines through the transfer pattern.

In an embodiment of the invention, the pad and the pixel electrodes are constructed from a same film layer.

In an embodiment of the invention, the touch panel further includes a plurality of touch signal lines disposed on the first insulation layer and respectively and electrically connected the touch electrodes, where the solid portion of each of the touch electrodes includes a plurality of first network lines and a plurality of second network lines. The second network lines are intersected to the first network lines to define the opening portions, where each of the touch signal lines includes a plurality of first portions and a plurality of second portions. Each of the first portions is parallel and overlapped with one corresponding first network line. The second portions and the first portions are arranged alternately and serially connected to form the touch signal line, where the second portion is curved to bypass the semiconductor pattern and is not overlapped with the first network line.

In an embodiment of the invention, the touch panel further includes a plurality of scan lines, a plurality of data lines and a plurality of conductive patterns. The scan lines are electrically connected to the gates of the active components. The data lines are electrically connected to the sources of the active components. The conductive patterns are respectively and electrically connected to the touch electrodes and are respectively overlapped with the data lines.

Another embodiment of the invention provides a touch panel including a first substrate, a touch electrode, a first insulation layer, a touch signal line, a transfer pattern, a second insulation layer and a pad. The first substrate has an active region and a periphery region outside the active region. The touch electrode is disposed on the active region of the first substrate. The first insulation layer is disposed on the first substrate and the touch electrode. The touch signal line is disposed on the first insulation layer and has a first end and a second end. The first end of the touch signal line is electrically connected to the touch electrode, and the second end of the touch signal line is located on the periphery region. The transfer pattern is located on the periphery region and on the first insulation layer and is electrically connected to the second end of the touch signal line. The second insulation layer is disposed on the transfer pattern. The pad is disposed on the second insulation layer and is electrically connected to the second end of the touch signal line through the transfer pattern.

In another embodiment of the invention, the gate insulation layer has a sixth contact via, and the transfer pattern is electrically connected to the second end of the touch signal line through the sixth contact via.

In another embodiment of the invention, the touch panel further includes an intermediate dielectric layer disposed on the gate. The intermediate dielectric layer has a fourth contact via and a fifth contact via, where the source and the drain are disposed on the intermediate dielectric layer and are electrically connected to the semiconductor pattern through the fourth contact via and the fifth contact via.

In another embodiment of the invention, the gate insulation layer has a sixth contact via. The intermediate dielectric layer has a seventh contact via overlapped and connected with the sixth contact via. The transfer pattern is disposed on the intermediate dielectric layer and is electrically connected to the second end of the touch single line through the sixth contact via and the seventh contact via.

In another embodiment of the invention, the transfer pattern and the source are constructed from a same film layer.

In another embodiment of the invention, the transfer pattern and the gate are constructed from a same film layer.

An embodiment of the invention provides a touch panel including a first substrate, a plurality of touch electrodes, a first insulation layer, a plurality of touch signal lines and a plurality of active components. The first substrate has an active region. The touch electrodes are disposed on the active region of the first substrate. The first insulation layer covers the touch electrodes. The touch signal lines are disposed on the first insulation layer, where each of the touch signal lines is electrically connected to one corresponding touch electrode, and the first insulation layer is located between the touch signal lines and the touch electrodes. The active components are disposed on the first insulation layer.

According to the above description, the touch electrodes are disposed on the first substrate and a part of the active component is substantially shielded by the touch electrodes. In this way, the touch electrodes are not easy to be shielded by other conductive layer of the touch panel, such that the touch panel has a good performance.

In the touch panel of one embodiment of the invention, the common electrode and the touch signal lines are electrically independent, so that the common electrode and the touch signal lines are adapted to simultaneously execute a display operation and a touch sensing operation, and it is unnecessary to respectively execute the display operation and the touch sensing operation in time-division. In this way, a processing performance of the touch panel is enhanced to cope with a demand of high-end products.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
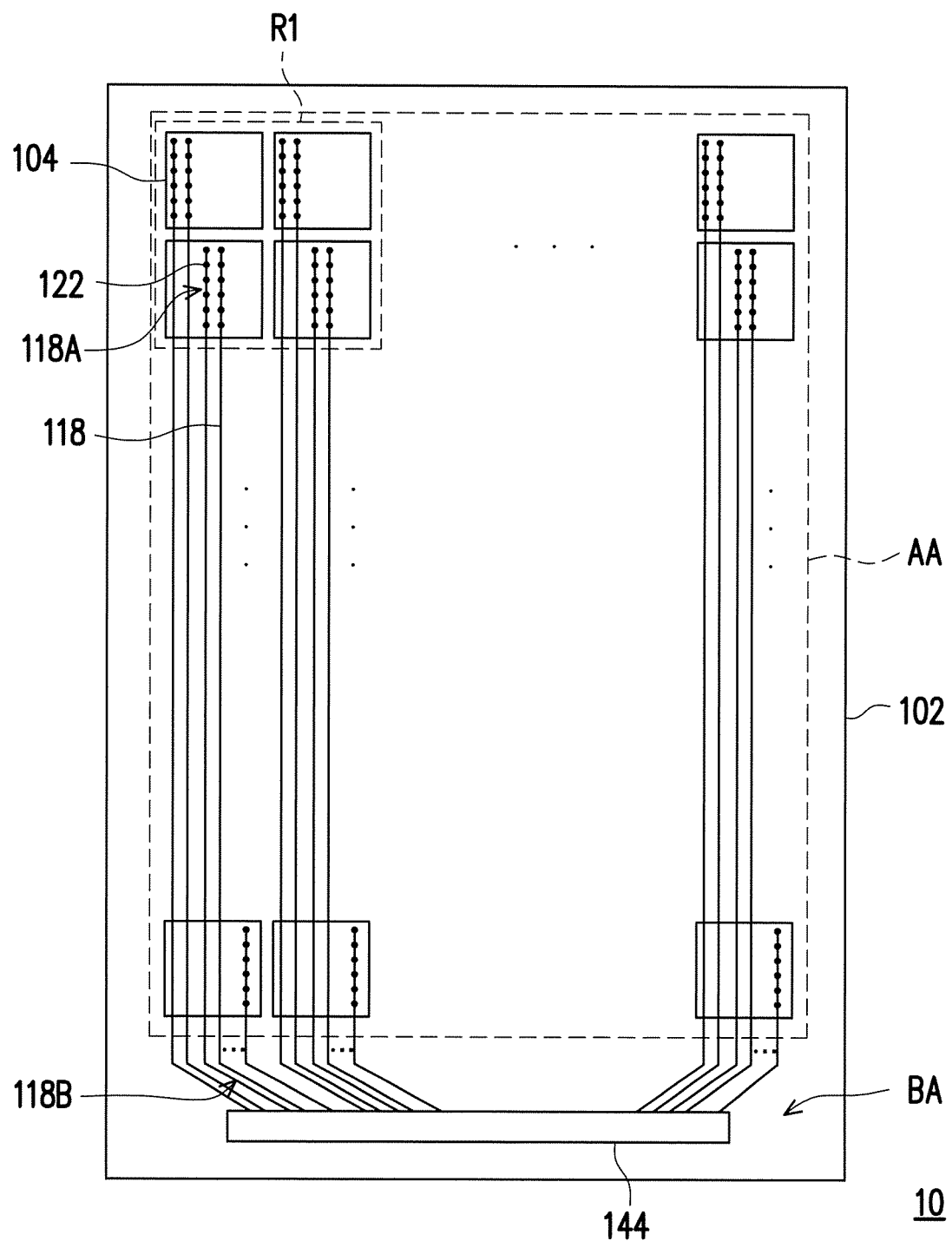
FIG. 1 is a top view of a touch and active component substrate of a touch panel according to an embodiment of the invention.

In the following description, specific embodiments are described in detail with reference of figures. However, the invention may be embodied in different forms, and the invention is not limited to the embodiments provided below. To be specific, the embodiments are provided such that the invention will be thorough and complete, and the scope of the invention is fully conveyed to those skilled in the art. In the figures, the dimensions of layers and zones are exaggerated for clarity's sake, and the same or corresponding symbols refer to the same or corresponding elements.

It should be noted that although the terms "first", "second", "third", etc. may be used for describing various elements, components, regions, layers and/or portions, the elements, components, regions, layers and/or portions are not limited by these terms. These terms are only used for separating one element, component, region, layer or portion from another element, component, region, layer or portion. Therefore, the following discussed "first element", "component", "region", "layer" or "portion" may be referred to as the second element, component, region, layer or portion without departing from the scope of the invention.

The terminology used herein is for the purpose of describing particular embodiments and is not intended to be limiting of the invention. As used herein, the singular forms "a," "an" and "the" are intended to include the plural forms as well, unless the context clearly indicates otherwise. "or" represents "and/or". The term "and/or" used herein includes any or a combination of one or more of the associated listed items. It will be further understood that the terms "comprises," "comprising," "includes" and/or "including," when used herein, specify the presence of stated features, regions, integers, steps, operations, elements, and/or components, but do not preclude the presence or addition of one or more other features, regions, integers, steps, operations, elements, components, and/or groups thereof.

Moreover, relative terms such as "under" or "bottom" and "above" or "top" may be used for describing a relationship of one element and another element as that shown in figures. It should be noted that the relative terms are intended to include a different orientation of the device besides the orientation shown in the figure. For example, if a device in a figure is flipped over, the element originally described to be located "under" other element is oriented to be located "above" the other element. Therefore, the illustrative term "under" may include orientations of "under" and "on", which is determined by the specific orientation of the figure. Similarly, if a device in a figure is flipped over, the element originally described to be located "below" or "underneath" other element is oriented to be located "on" the other element. Therefore, the illustrative term "under" or "below" may include orientations of "above" and "under".

The terms "about", "substantial" or "approximate" used herein include the related value and an average within an acceptable deviation range for a specific value determined by those skilled in the art, considering a discussed measurement and a specific number of errors related to the measurement (i.e. a limitation of a measuring system). For example, "about" may represent a range within one or a plurality of standard deviations of the related value, or within ±30%, ±20%, ±10%, ±5%.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The exemplary embodiment is described below with reference of a cross-sectional view of a schematic diagram of an idealized embodiment. Therefore, a shape change of the figure serving as a result of manufacturing techniques and/or tolerances may be expected. Therefore, the embodiment of the invention should not be construed as limited to a particular shape of a region as shown herein, but includes a shape deviation caused by manufacturing tolerance. For example, a shown or described flat area may generally have rough and/or non-linear features. Moreover, a shown acute angle may be round. Therefore, a region shown in the figure is essentially schematic, and a shape thereof is not intended to show an accurate shape of the region, and is not intended to limit a range of the claims of the invention.

Figure 2:
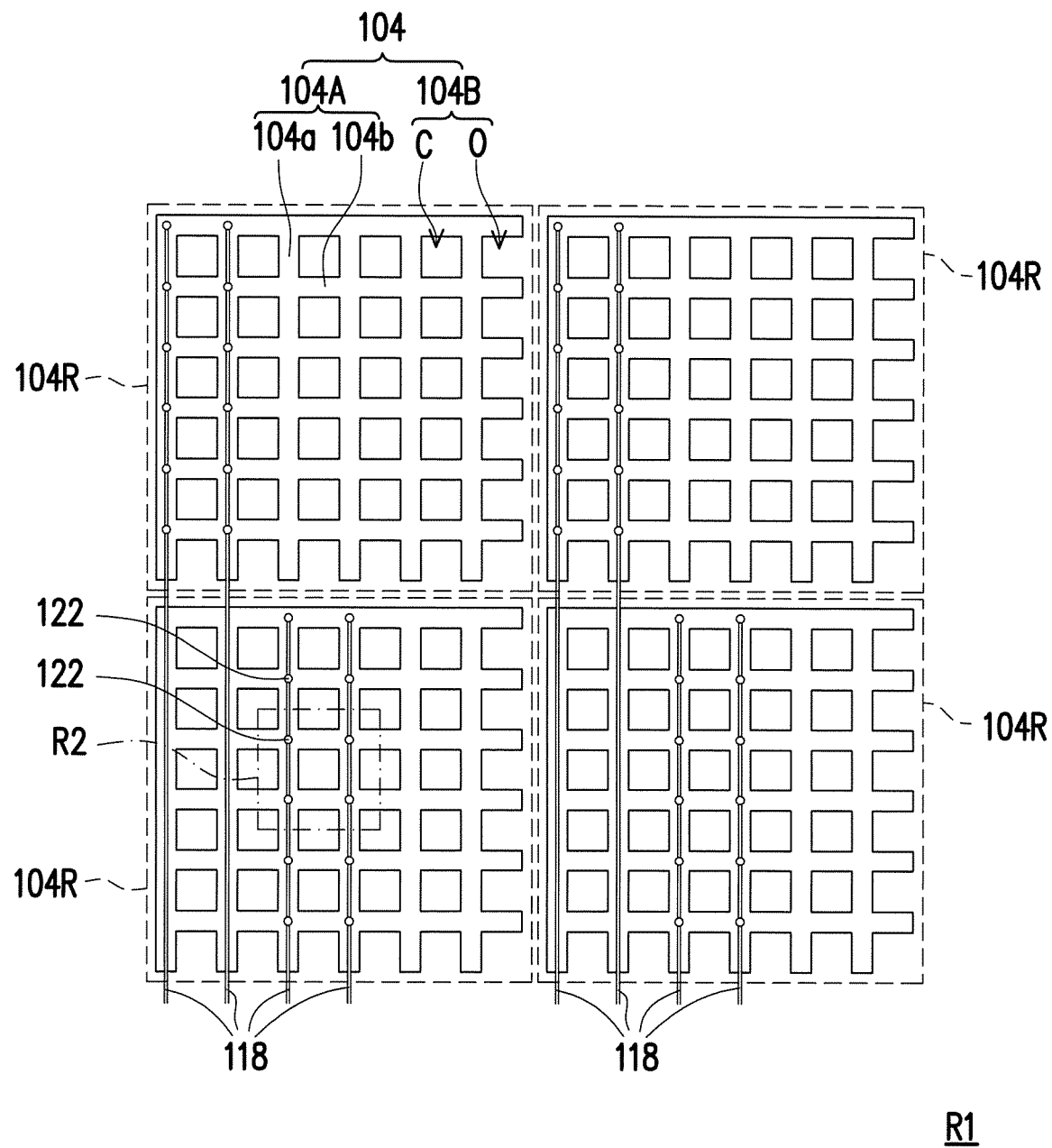
FIG. 2 is an enlarged view of region R1 of the touch and active component substrate of FIG. 1.
Figure 3:
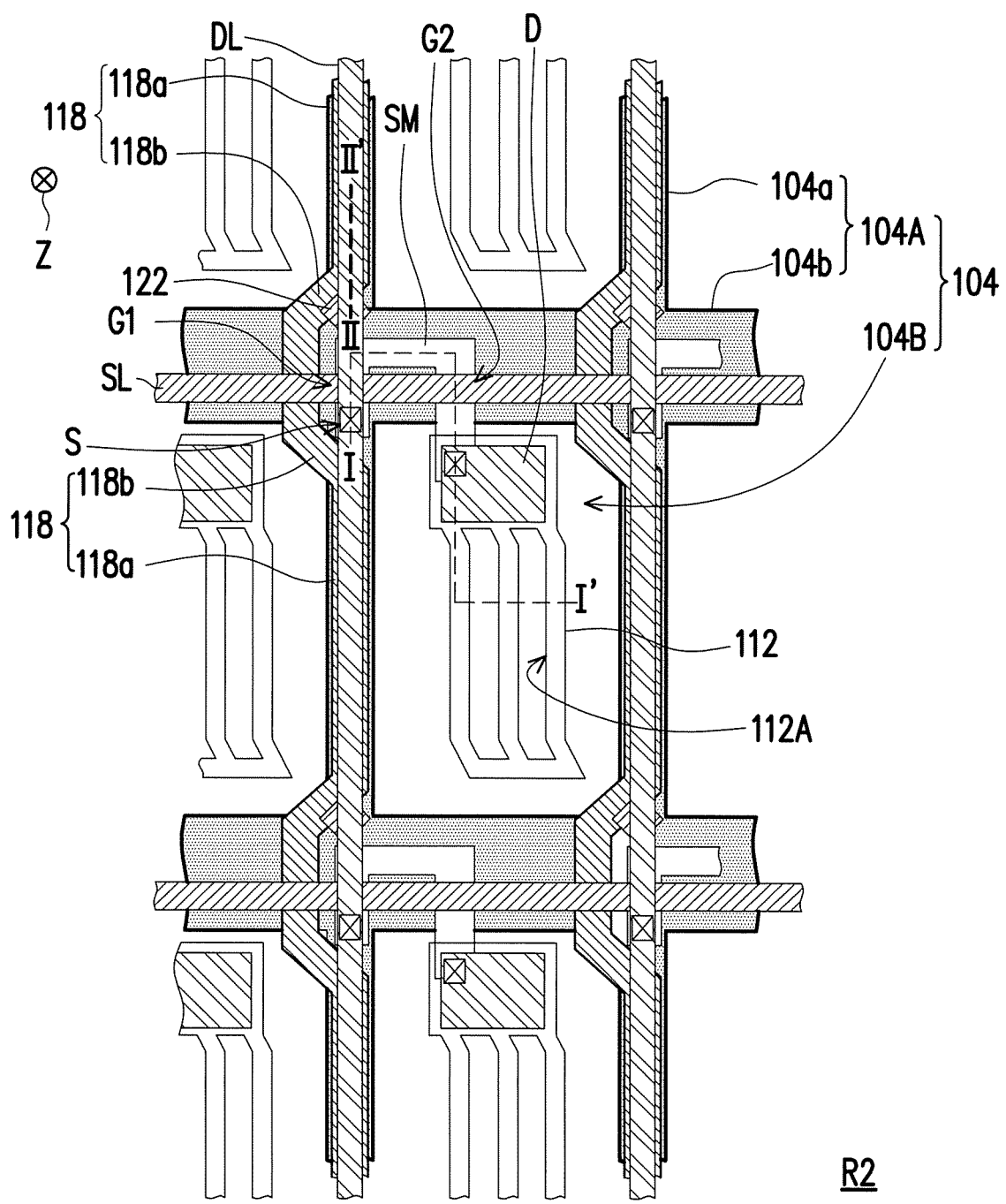
FIG. 3 is an enlarged bottom view of a region of the touch and active component substrate of the touch panel according to an embodiment of the invention.
Figure 4:
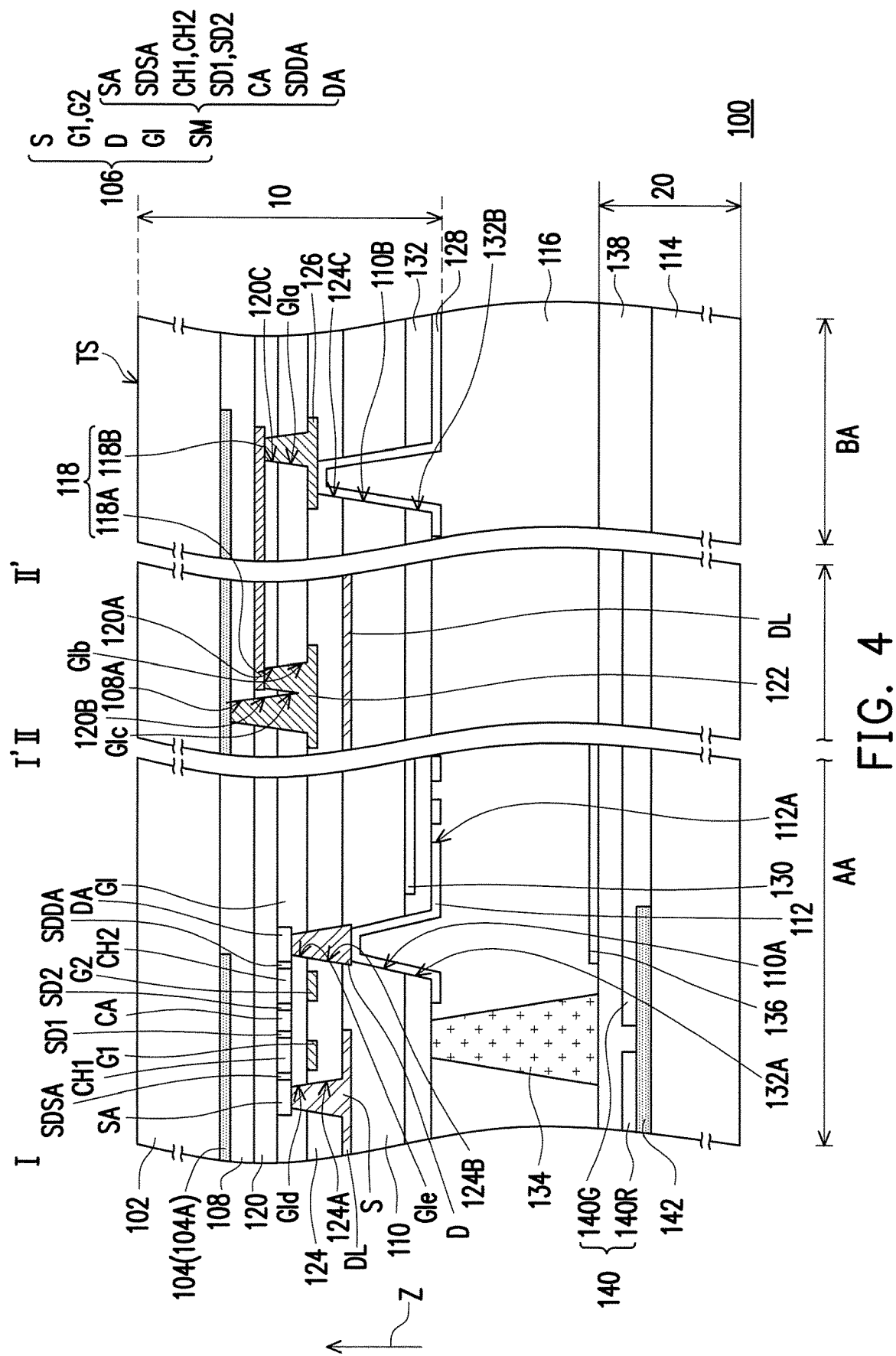
FIG. 4 is a cross-sectional view of a touch panel according to an embodiment of the invention.

FIG. 1 is a top view of a touch and active component substrate of a touch panel according to an embodiment of the invention. For clarity's sake, FIG. 1 illustrates touch electrode 104, conductive pattern 122, touch signal lines 118, first substrate 102 and processing unit 144, and illustration of other components of the touch and active component substrate 10 is omitted. FIG. 2 is an enlarged view of region R1 of the touch and active component substrate 10. FIG. 3 is an enlarged bottom view of a region of the touch and active component substrate of the touch panel according to an embodiment of the invention. FIG. 3 corresponds to region R2 of FIG. 2. FIG. 4 is a cross-sectional view of a touch panel according to an embodiment of the invention, and FIG. 4 is the cross-sectional view along section lines I-I', II-II' of FIG. 3. The enlarged bottom view of the touch and active component substrate 10 of FIG. 3 is a diagram viewing along a direction z from a display medium 116 to a first substrate 102 of FIG. 4.

Referring to FIG. 1 to FIG. 4, the touch and active component substrate 10 includes the first substrate 102, touch electrodes 104 and active components 106. Referring to FIG. 4, the touch panel 100 includes the touch and active component substrate 10, a second substrate 114 disposed opposite to the first substrate 102, and the display medium 116 disposed between the first substrate 102 and the second substrate 114, where the touch electrodes 104 and the active components 106 are disposed between the first substrate 102 and the display medium 116. In the present embodiment, support structures 134 (for example, but not limited to: photo-spacers) may be selectively disposed between the first substrate 102 and the second substrate 114 to form cell gaps, and the display medium 116 may be filled into the cell gaps such that the display panel 100 has a display function. In the present embodiment, the display medium 116 is, for example, liquid crystal, though the invention is not limited thereto.

Referring to FIG. 1, the first substrate 102 of the touch and active component substrate 10 has an active region AA and a periphery region BA substantially surrounding the active region AA. The ranges of the active region AA and the periphery region BA shown in FIG. 1 are schematic, and the invention is not limited thereto, and the ranges of the active region AA and the periphery region BA may be varied according to an actual application. In an embodiment of the invention, materials of the first substrate 102 and the second substrate 114 may be the same or different. Further, the material of the first substrate 102 having a touch surface TS (shown in FIG. 4) may be a transparent material, and the material of the second substrate 114 may be a transparent or opaque/reflective material. The transparent material is, for example, glass, quartz, organic polymer or other suitable material, and the opaque/reflective material is, for example, wafer, ceramic or other suitable material.

Referring to FIG. 1 and FIG. 4, the touch electrodes 104 are disposed on the active region AA of the first substrate 102. It may be unnecessary to disposed other conductive layer between the touch electrodes 104 and the touch surface TS of the first substrate 102. In this way, the touch electrodes 104 are not completely shielded by the other conductive layer of the touch panel 100 for the user, so that good touch sensitivity is maintained. Referring to FIG. 1 and FIG. 2, each of the touch electrodes 104 is located within a touch electrode region 104R to present a network structure, where the network structure has a solid portion 104A and opening portions 104B defined by the solid portion 104A. Referring to FIG. 3, the solid portion 104A of each touch electrode 104 includes first network lines 104a and second network lines 104b, where the second network lines 104b are intersected with the first network lines 104a to define the opening portions 104B. Referring to FIG. 2, the solid portion 104A may define the opening portions 104B. The opening portions 104B may include closed openings C, opened openings O or a combination thereof. In the present embodiment, the touch electrodes 104 may be made of a conductive material that is not easy to be deteriorated due to heat, for example, aluminium, titanium, molybdenum, magnesium, neodymium, silver, other suitable material or a combination of at least two of the above materials. Moreover, the touch electrodes 104 can also be made of metal with low reflectivity (for example, a black metal layer) to improve optical performance.

Referring to FIG. 4, a first insulation layer 108 is located on the first substrate 102 and the touch electrodes 104, the active components 106 are disposed on the first insulation layer 108, and a second insulation layer 110 is disposed on the active components 106. The touch electrodes 104 and the active components 106 are located at two opposite sides of the first insulation layer 108, and the active components 106 are sandwiched between the first insulation layer 108 and the second insulation layer 110.

Referring to FIG. 3 and FIG. 4, the active components 106 may include thin-film transistors (TFTs). In the present embodiment, each of the active components 106 may include a semiconductor pattern SM, a gate G1/G2, a gate insulation layer GI located between the semiconductor pattern SM and the gate G1/G2, an intermediate dielectric layer 124 covering the gate G1/G2 and a source S and a drain D located on the intermediate dielectric layer 124. If viewing along a normal direction from an outer side of the first substrate 102 towards the touch electrodes 104 and the semiconductor pattern SM, most of the semiconductor pattern SM is shielded by the solid portion 104A of one corresponding touch electrode 104. In the present embodiment, the semiconductor pattern SM includes a source region SA, a drain region DA, a channel region CH1/CH2, a source shallow doped region SDSA and a drain shallow doped region SDDA. The channel region CH1/CH2 is located between the source region SA and the drain region DA. The source shallow doped region SDSA is located between the channel region CH1/CH2 and the source region SA. The drain shallow doped region SDDA is located between the channel region CH1/CH2 and the drain region DA. In the present embodiment, the semiconductor pattern SM may selectively include a connection region CA and a shallow doped region SD1/SD2, the channel region CH1/CH2 of the semiconductor pattern SM may include a first channel region CH1 and a second channel region CH2, and the connection region CA is located between the first channel region CH1 and the second channel region CH2, the shallow doped region SD1 is located between the connection region CA and the first channel region CH1, the shallow doped region SD2 is located between the connection region CA and the second channel region CH2, the source shallow doped region SDSA is located between the source region SA and the first channel region CH1, and the drain shallow doped region SDDA is located between the drain region DA and the second channel region CH2. The source shallow doped region SDSA, the drain shallow doped region SDDA and the shallow doped region SD1/SD2 may suppress current leakage of the active components 106. The connection region CA may be a heavily doped region, so as to decrease a resistance between the first channel region CH1 and the second channel region CH2. It should be noted that types of the TFTs included in the aforementioned active components 106 are only used as an example, and are not intended to limit the invention, and the invention does not limit that the TFT included in the active component 106 must be a double gate TFT including a plurality of channel regions (i.e. the first channel region CH1, the second channel region CH2), and does not limit that the semiconductor pattern SM of the double gate TFT must include the heavily doped connection region CA, the source shallow doped region SDSA, the drain shallow doped region SDDA and/or the shallow doped region SD1/SD2. In other embodiments, the active component 106 may selectively include other proper type of TFT, which is described in subsequent paragraphs with reference of figures.

In the present embodiment, the source S and the drain D located on the intermediate dielectric layer 124 are respectively electrically connected to the source region SA and the drain region DA. In the present embodiment, the gate insulation layer GI has contact vias GId, GIe, the intermediate dielectric layer 124 has a fourth contact via 124A and a fifth contact via 124B, where the contact via GId and the fourth contact via 124A are overlapped and connected with each other, the contact via GIe and the fifth contact via 124B are overlapped and connected with each other, the source S is electrically connected to the source region SA of the semiconductor pattern SM through the contact via GId and the fourth contact via 124A, and the drain D is electrically connected to the drain region DA of the semiconductor pattern SM through the contact via GIe and the fifth contact via 124B.

The source S is electrically connected to a data line DL of the touch panel 100 (as shown in FIG. 3), and the drain D is electrically connected to a pixel electrode 112. In the present embodiment, the opening portion 104B of the touch electrode 104 is overlapped with the corresponding pixel electrode 112. The pixel electrode 112 is, for example, completely overlapped with a layout range of the corresponding opening portion 104B. As shown in FIG. 3, in the present embodiment, the source S is, for example, a part of the data line DL, and the source S and the data line DL may be selectively constructed from a same film layer. However, the invention is not limited thereto, and in other embodiments, the source S and the data line DL may also belong to different film layers.

The first gate G1, the second gate G2 are electrically connected to a scan line SL of the touch panel 100, referring to FIG. 3 and FIG. 4, the first gate G1 and the second gate G2 are connected to each other and are respectively located on the top of the first channel region CH1 and the second channel region CH2, and the double gate design may suppress the current leakage of the active component 106, though the invention is not limited thereto. In the present embodiment, the first gate G1 and the second gate G2 are, for example, a part of the scan line SL, such that the gate G1/G2 and the scan line SL may be selectively constructed from a same film layer. However, the invention is not limited thereto, and in other embodiments, the gate G1/G2 and the scan line SL may also belong to different film layers.

Referring to FIG. 3 and FIG. 4, the pixel electrodes 112 are disposed on the second insulation layer 110 and are respectively electrically connected to the drains D of the active components 106. In detail, the second insulation layer 110 has a contact via 110A, and an inter-layer insulation layer 132 has a contact via 132A, where the contact via 110A and the contact via 132A are connected. The pixel electrode 112 is electrically connected to the drain D through the contact vias 110A, 132A. In the present embodiment, the pixel electrode 112 has a plurality of slits 112A, where the slits 112A are overlapped with the common electrode 130. The common electrode 130 and the pixel electrode 112 are separated by the inter-layer insulation layer 132, and a voltage difference between the common electrode 130 and the pixel electrode 112 may be used to drive the display medium 116 to display images. The touch panel 100 of the present embodiment may be selectively a fringe-field switching (FFS) mode display panel. However, the invention is not limited thereto, and in another embodiment of the invention, if the pixel electrode 112 and the common electrode 130 are disposed on a same surface, the display panel may also be an in-plane switching (IPS) mode display panel. In still another embodiment of the invention, the display panel may also be other suitable mode display panel.

In the present embodiment, the common electrode 130 and the touch signal lines 118 may be electrically independent to each other, so that the common electrode 130 and the touch signal lines 118 are adapted to simultaneously execute a display operation and a touch sensing operation, and it is unnecessary to respectively execute the display operation and the touch sensing operation in time-division. In this way, a processing performance of the touch panel 100 is enhanced to cope with a demand of high-end products.

Referring to FIG. 1 to FIG. 4, the touch panel 100 further includes touch signal lines 118 extending from the active region AA to the periphery region BA. In the present embodiment, a part of the touch signal line 118 located on the active region AA is substantially shielded by the solid portion 104A of one corresponding touch electrode 104. As shown in FIG. 4, in the present embodiment, the touch signal line 118 is disposed on the first insulation layer 108 and is electrically connected to the touch electrode 104 through the conductive pattern 122. As shown in FIG. 3 and FIG. 4, in the present embodiment, the conductive pattern 122 may be overlapped with the data line DL to decrease decline of aperture rate, though the invention is not limited thereto. A third insulation layer 120 is disposed on the touch signal lines 118, the active components 106 are disposed on the first insulation layer 108 and the third insulation layer 120 stacked with each other, and the third insulation layer 120 is covered by the gate insulation layer GI. In the present embodiment, the conductive pattern 122 is disposed on the third insulation layer 120 and the gate insulation layer GI stacked with each other, and the conductive pattern 122 is covered by the intermediate dielectric layer 124. In the present embodiment, the conductive pattern 122 and the gate G may be constructed from a same film layer, though the invention is not limited thereto, and in other embodiments, the conductive pattern 122 and the other conductive film layer of the active component 106 may be constructed from a same film layer or constructed separately. Based on consideration of conductivity, a material of the conductive pattern 122 is preferably a material with high conductivity. For example, the material of the conductive pattern 122 may be metals, metal nitrides, metal oxides, metal nitrogen oxides, a stacked layer of a metal material and other conductive material or an alloy thereof.

Moreover, in the present embodiment, the third insulation layer 120 has a first contact via 120A disposed on the touch signal line 118 and a second contact via 120B disposed outside the touch signal line 118, the first insulation layer 108 has a third contact via 108A overlapped and connected with the second contact via 120B, and the gate insulation layer GI has a contact via GIb and a contact via GIc respectively overlapped and connected to the first contact via 120A and the second contact via 120B. The conductive pattern 122 is electrically connected between the touch signal lines 118 and the touch electrodes 104 through the first contact via 120A, the second contact via 120B, the third contact via 108A and contact vias GIb, GIc. In the present embodiment, based on the consideration of reducing resistance, the material of the touch signal lines 118 may selectively include metal and alloy with low resistance. Moreover, when a rapid thermal annealing process is adopted to form the intermediate dielectric layer 124, color and material characteristics of the touch signal lines 118 using the aforementioned low-resistance material are not easy to be changed, which avails an optical and electrical performance of the touch panel. The optical performance of the touch signal lines 118 can also be improved by using a low reflective metal.

Referring to FIG. 1 and FIG. 4, in the present embodiment, each of the touch signal lines 118 has a first end 118A and a second end 118B. The first end 118A is located on the active region AA and is electrically connected to one corresponding touch electrode 104. The second end 118B of the touch signal line 118 is located on the periphery region BA and is electrically connected to a pad 128 through a transfer pattern 126. The processing unit 144 is bonded to the pad 128, and the processing unit 144 is, for example, an integrated circuit. In the present embodiment, the transfer pattern 126 is located on the periphery region BA and is disposed on the third insulation layer 120 and the gate insulation layer GI. The transfer pattern 126 and the gate G, the conductive pattern 122 are selectively constructed from a same film layer. The third insulation layer 120 has a contact via 120C, and the gate insulation layer GI has a sixth contact via GIa overlapped and connected with the contact via 120C. The transfer pattern 126 is electrically connected to the second end 118B of the touch signal line 118 through the contact via 120C and the sixth contact via GIa. Moreover, in the present embodiment, the pad 128 is disposed on the intermediate dielectric layer 124, the second insulation layer 110 and the inter-layer insulation layer 132. The pad 128 and the pixel electrode 112 are constructed from a same film layer. The intermediate dielectric layer 124 has a contact via 124C, the second insulation layer 110 has a contact via 110B, the inter-layer insulation layer 132 has a contact via 132B, and the contact vias 124C, 110B, 132B are overlapped and connected with each other. At least a part of the pad 128 is filled in the contact vias 124C, 110B, 132B to electrically connect the transfer pattern 126.

Referring to FIG. 3, in the present embodiment, the touch signal lines 118 may include first portions 118a and second portions 118b. The first portions 118a are parallel to and overlapped with the corresponding first network lines 104a, and the second portions 118b and the first portions 118a are arranged alternately and serially connected to form the touch signal lines 118. The second portions 118b may be curved to bypass the semiconductor pattern SM and avoid overlapping with the first network lines 104a. In this way, the semiconductor pattern SM of the active component 106 may be formed on a flat surface, which avails maintaining an electrical property of the active component 106.

Referring to FIG. 4, besides the touch and active component substrate 10, the touch panel 100 further includes a counter substrate 20 disposed opposite to the touch and active component substrate 10 and a display medium 116 disposed between the touch and active component substrate 10 and the counter substrate 20. In the present embodiment, the counter substrate 20 may include the second substrate 114, a light-shielding pattern 142 and a filter pattern 140. The light-shielding pattern 142 is located on the second substrate 114 and shields a boundary of the filter pattern 140. For example, the light-shielding pattern 142 may be a black matrix (BM), and the filter pattern 140 includes a red filter pattern 140R, a green filter pattern 140G and a blue filter pattern. However, the invention is not limited thereto, and in other embodiments, the filter pattern 140 may also include a permutation and combination of other filter patterns having different colors. Moreover, the counter substrate 20 further includes a flattening layer 138, where the flattening layer 138 covers the filter pattern 140. In the present embodiment, a conductive layer 136 may be further disposed on the flattening pattern 138 to use for viewing angle control. The conductive layer 136 may be selectively a transparent conductive material, for example, indium tin oxide, etc. The touch electrodes 104 are closer to the touch surface TS of the first substrate 102 compared to the conductive layer 136, so that the conductive layer 136 does not block the touch electrodes 104 to receive touch signals, so as to avoid a situation that the touch signals are shielded by the conductive layer 136.

Figure 5:
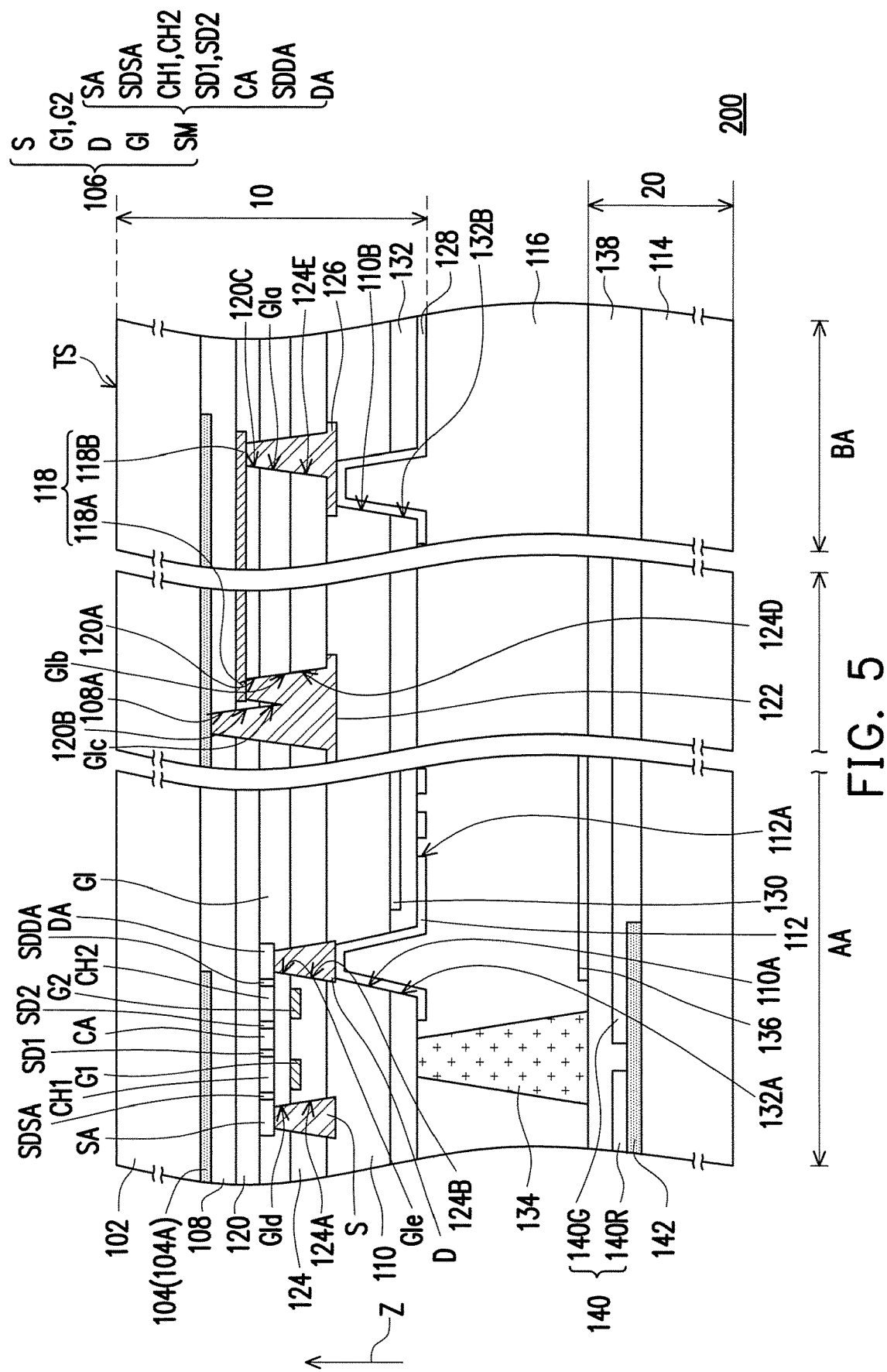
FIG. 5 is a cross-sectional view of a touch panel according to another embodiment of the invention.

FIG. 5 is a cross-sectional view of a touch panel according to another embodiment of the invention. A basic structure of the touch panel 200 of FIG. 5 is similar to the basic structure of the touch panel 100 of FIG. 4. Unless otherwise noted, detailed description of the touch panel 200 may refer to related description of the touch panel 100. In the touch panel 200, the conductive pattern 122 and the transfer pattern 126 are disposed on the intermediate dielectric layer 124, and the source S, the drain D, the conductive pattern 122 and the transfer pattern 126 may be constructed from a same film layer. The intermediate dielectric layer 124 may have a contact via 124D and a seventh contact via 124E, where the contact via 124D is connected with the first contact via 120A and the second contact via 120B. The seventh contact via 124E, the contact via 120C, the sixth contact via GIa are overlapped and connected. The conductive pattern 122 is electrically connected between the touch electrode 104 and the first end 118A of the touch signal line 118 through the first contact via 120A, the second contact via 120B, the third contact via 108A and the contact vias GIb, GIc, 124D. In other variations, instead of using a single contact via 124D, the intermediate dielectric layer 124 has two contact vias to respectively overlap and connect with the first contact via 120A and the second contact via 120B. The transfer pattern 126 is electrically connected to the second end 118B of the touch signal line 118 through the contact via 120C, the sixth contact via GIa and the seventh contact via 124E, and the pad 128 is filled in the contact vias 110B, 132B to electrically connect the transfer pattern 126.

Figure 6:
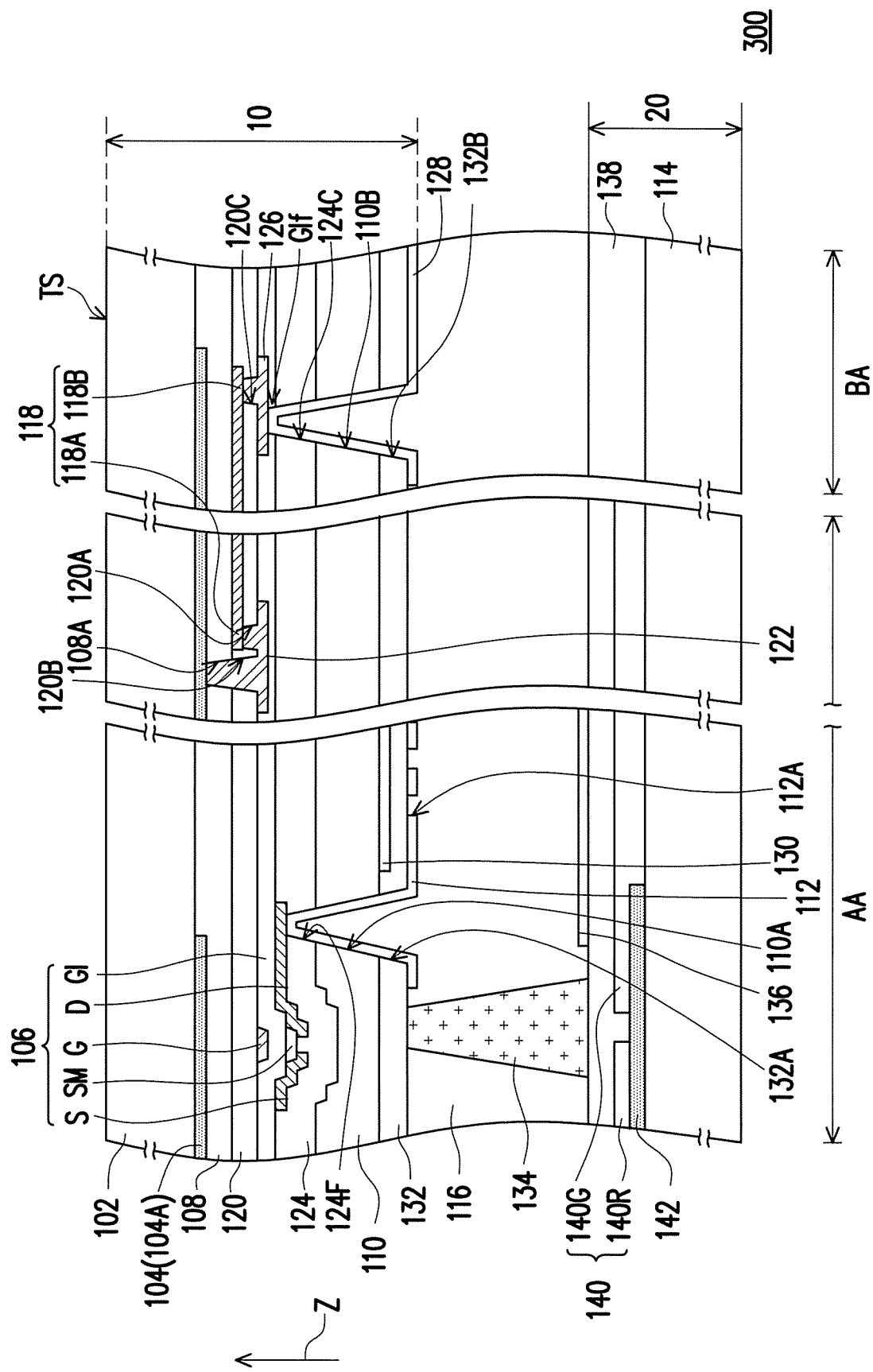
FIG. 6 is a cross-sectional view of a touch panel according to still another embodiment of the invention.

FIG. 6 is a cross-sectional view of a touch panel according to still another embodiment of the invention. A basic structure of the touch panel 300 of FIG. 6 is similar to the basic structure of the touch panel 100 of FIG. 4. Unless otherwise noted, detailed description of the touch panel 300 may refer to related description of the touch panel 100. In the touch panel 300, the active component 106 is a single gate type TFT. The active component 106 has the gate G, the gate insulation layer GI, the semiconductor pattern SM, the source S and the drain D. The source S and the drain D are respectively electrically connected to two zones of the semiconductor pattern SM. The gate G is overlapped with the semiconductor pattern SM. The gate insulation layer GI is disposed between the semiconductor pattern SM and the gate G. In the present embodiment, the gate G may be disposed between the semiconductor pattern SM and the first substrate 102. In other words, the gate G may be disposed under the semiconductor pattern SM, and the active component 106 may be a bottom gate type TFT. However, the invention is not limited thereto, and in other embodiment, the active component 106 can also be a top gate type TFT or other suitable type of TFT.

In the present embodiment, the intermediate dielectric layer 124 covers the active component 106 and has a contact via 124F, where the contact via 124F is overlapped and connected with the contact vias 110A, 132A, and the pixel electrode 112 is filled in the contact vias 124F, 110A, 132A to electrically connect the drain D. Moreover, in the touch panel 300, the conductive pattern 122 and the transfer pattern 126 may be disposed on the third insulation layer 120, and the gate G, the conductive pattern 122 and the transfer pattern 126 may be selectively constructed from a same film layer. In the present embodiment, the conductive pattern 122 is electrically connected between the touch electrode 104 and the first end 118A of the touch signal line 118 through the first contact via 120A, the second contact via 120B and the third contact via 108A, and the transfer pattern 126 is electrically connected to the second end 118B of the touch signal line 118 through the contact via 120C. Moreover, the gate insulation layer GI may have a contact via GIf, where the contact via GIf is overlapped and connected with the contact vias 124C, 110B, 132B, and the pad 128 is filled in the contact vias GIf, 124C, 110B, 132B to electrically connect the transfer pattern 126.

Figure 7:
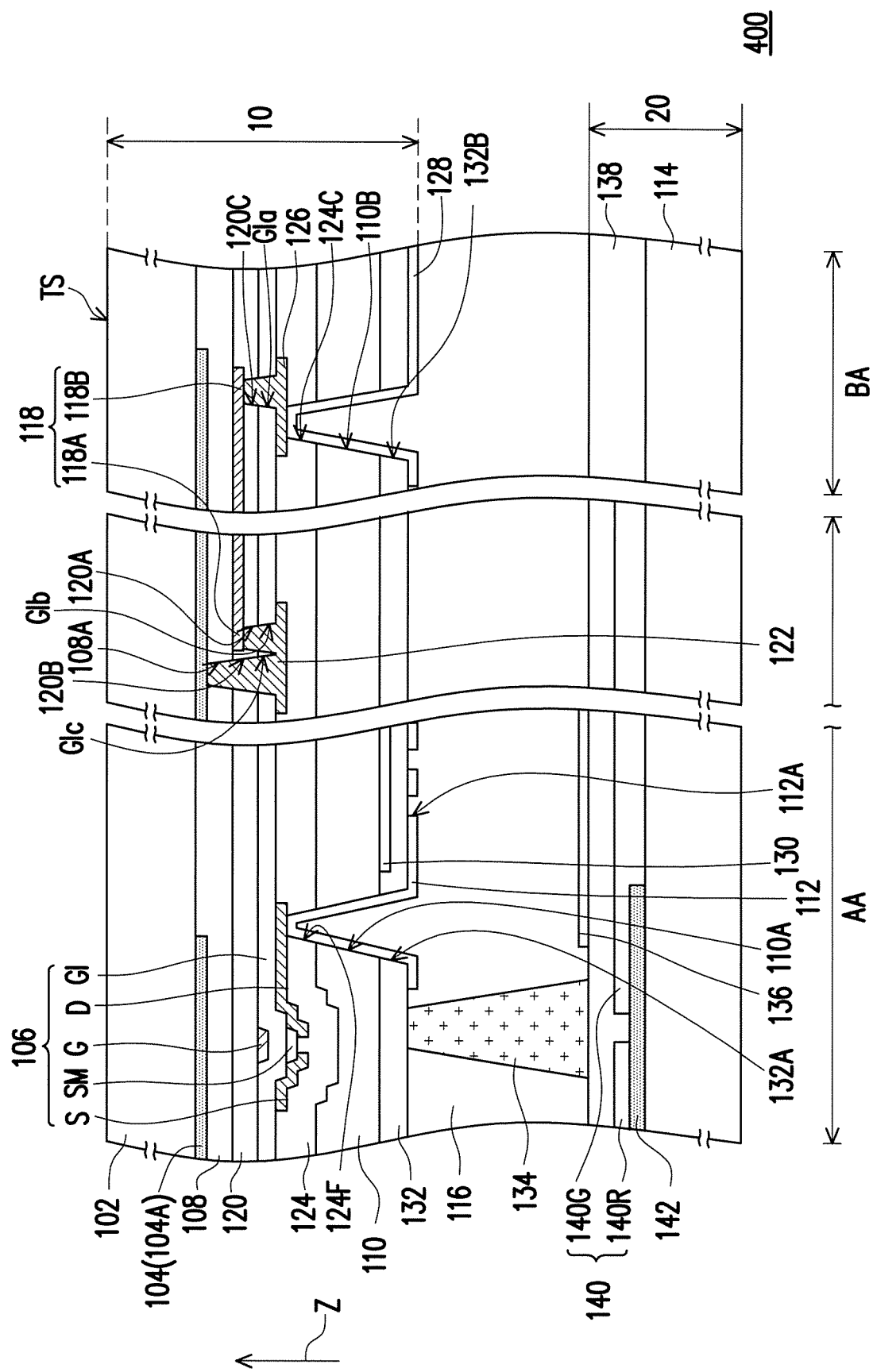
FIG. 7 is a cross-sectional view of a touch panel according to yet another embodiment of the invention.

FIG. 7 is a cross-sectional view of a touch panel according to yet another embodiment of the invention. A basic structure of the touch panel 400 of FIG. 7 is similar to the basic structure of the touch panel 300 of FIG. 6. Unless otherwise noted, detailed description of the touch panel 400 may refer to related description of the touch panel 300. In the touch panel 400, the conductive pattern 122 and the transfer pattern 126 may be disposed on the gate insulation layer GI, and the source S, the drain D, the conductive pattern 122 and the transfer pattern 126 may be constructed from a same film layer. In the present embodiment, the conductive pattern 122 is electrically connected between the touch electrode 104 and the first end 118A of the touch signal line 118 through the first contact via 120A, the second contact via 120B, the third contact via 108A and the contact via GIb/GIc, and the transfer pattern 126 is electrically connected to the second end 118B of the touch signal line 118 through the contact via 120C and the sixth contact via GIa. Moreover, the pad 128 is filled in the contact vias 124C, 110B, 132B to electrically connect the transfer pattern 126.

In the touch panel of an embodiment of the invention, the touch electrodes are disposed on the first substrate and a part of the active components is substantially shielded by the touch electrodes. Therefore, the touch electrodes are not easy to be shielded by other conductive layer of the touch panel, such that the touch panel has good performance. Particularly, in the touch panel of an embodiment of the invention, the common electrode and the touch signal lines are electrically independent, so that the common electrode and the touch signal lines are adapted to simultaneously execute a display operation and a touch sensing operation, and it is unnecessary to respectively execute the display operation and the touch sensing operation in time-division. In this way, a processing performance of the touch panel is enhanced to cope with a demand of high-end products.

It will be apparent to those skilled in the art that various modifications and variations may be made to the structure of the invention without departing from the scope or spirit of the invention. In view of the foregoing, it is intended that the invention cover modifications and variations of this invention provided they fall within the scope of the following claims and their equivalents.

What is claimed is:
1. A touch panel, comprising:
   a first substrate, having an active region;
   a plurality of touch electrodes, disposed on the active region of the first substrate, and each of the touch electrodes comprising a network structure, wherein the network structure has a solid portion and a plurality of opening portions defined by the solid portion, the solid portion of each of the touch electrodes comprises:
   a plurality of first network lines; and a plurality of second network lines, intersected to the first network lines to define the opening portions;
a plurality of active components, wherein each of the active components comprises a semiconductor pattern, and the semiconductor pattern is substantially shielded by the solid portion of one corresponding touch electrode;
a first insulation layer, located on the first substrate and the touch electrodes, wherein the active components are disposed on the first insulation layer;
a second insulation layer, disposed on the active components;
a plurality of pixel electrodes, disposed on the second insulation layer and respectively electrically connected to the active components, wherein each of the pixel electrodes is overlapped with at least one opening portion of one corresponding touch electrode; and
a plurality of touch signal lines, disposed on the first insulation layer and respectively electrically connected to the touch electrodes, wherein each of the touch signal lines comprises:
a plurality of first portions, each of the first portions being parallel and overlapped with one corresponding first network line; and
a plurality of second portions, the second portions and the first portions being arranged alternately and serially connected, wherein the second portion is curved to bypass the semiconductor pattern and is not overlapped with the first network line.

2. The touch panel as claimed in claim 1, further comprising:
a second substrate, disposed opposite to the first substrate; and
a display medium, disposed between the pixel electrodes and the second substrate, wherein the touch electrodes and the active components are located between the first substrate and the display medium.

3. The touch panel as claimed in claim 2, further comprising:
a conductive layer, disposed between the second substrate and the display medium.

4. The touch panel as claimed in claim 1, further comprising:
a third insulation layer, disposed on the touch signal lines, wherein the active components are disposed on the first insulation layer and the third insulation layer stacked with each other.

5. The touch panel as claimed in claim 4, wherein the third insulation layer has a first contact via disposed on the corresponding touch signal line and a second contact via disposed outside the corresponding touch signal line, the first insulation layer has a third contact via overlapped and connected with the second contact via, and the touch panel further comprises:
a conductive pattern, disposed on the third insulation layer, and electrically connected between the corresponding touch signal line and the touch electrode through the first contact via, the second contact via and the third contact via.

6. The touch panel as claimed in claim 5, wherein each of the active components further comprises a source, a gate, a gate insulation layer and a drain, the gate insulation layer is disposed between the gate and the semiconductor pattern and covers the third insulation layer.

7. The touch panel as claimed in claim 6, wherein the gate and the conductive pattern are constructed from a same film layer.

8. The touch panel as claimed in claim 4, wherein each of the active components further comprises a source, a gate, a gate insulation layer and a drain, the gate insulation layer is disposed between the gate and the semiconductor pattern and covers the third insulation layer, and the touch panel further comprises:
an intermediate dielectric layer, covering the gate, and having a fourth contact via and a fifth contact via, wherein the source and the drain are disposed on the intermediate dielectric layer and are respectively electrically connected to the semiconductor pattern through the fourth contact via and the fifth contact via; and
a conductive pattern, disposed on the intermediate dielectric layer, and electrically connected between one of the touch electrodes and one of the touch signal lines.

9. The touch panel as claimed in claim 8, wherein the source, the drain and the conductive pattern are constructed from a same film layer.

10. The touch panel as claimed in claim 4, wherein the first substrate further has a periphery region outside the active region, a first end of each of the touch signal lines is electrically connected to one corresponding touch electrode, and a second end of each of the touch signal lines is located on the periphery region, the touch panel further comprises:
a transfer pattern, located on the periphery region and disposed on the third insulation layer, wherein the transfer pattern is electrically connected to one of the touch signal lines; and
a pad, disposed on the second insulation layer and electrically connected to the one of the touch signal lines through the transfer pattern.

11. The touch panel as claimed in claim 10, wherein the pad and the pixel electrodes are constructed from a same film layer.

12. The touch panel as claimed in claim 1, wherein each of the active components further comprises a source, a gate, a gate insulation layer and a drain, the gate insulation layer is disposed between the gate and the semiconductor pattern, and the touch panel further comprises:
a plurality of scan lines, respectively electrically connected to the gates of the active components;
a plurality of data lines, respectively electrically connected to the sources of the active components; and
a plurality of conductive patterns, respectively electrically connected to the touch electrodes and respectively overlapped with the data lines.

13. A touch panel, comprising:
a first substrate, having an active region and a periphery region outside the active region;
a touch electrode, disposed on the active region of the first substrate;
a first insulation layer, disposed on the first substrate and the touch electrode;
a touch signal line, disposed on the first insulation layer and having a first end and a second end, wherein the first end of the touch signal line is electrically connected to the touch electrode, and the second end of the touch signal line is located on the periphery region;
a transfer pattern, located on the periphery region and the first insulation layer and electrically connected to the second end of the touch signal line;
a second insulation layer, disposed on the transfer pattern; and
a pad, disposed on the second insulation layer and electrically connected to the second end of the touch signal line through the transfer pattern.

14. The touch panel as claimed in claim 13, further comprising:
an active component, located on the active region, and comprising a source, a gate, a semiconductor pattern, a gate insulation layer and a drain, wherein the gate insulation layer is disposed between the gate and the semiconductor pattern, the source and the drain are respectively electrically connected to two regions of the semiconductor pattern, and the second insulation layer is disposed on the active component.

15. The touch panel as claimed in claim 14, wherein the gate insulation layer has a sixth contact via, and the transfer pattern is electrically connected to the second end of the touch signal line through the sixth contact via.

16. The touch panel as claimed in claim 14, further comprising:
an intermediate dielectric layer, disposed on the gate, and having a fourth contact via and a fifth contact via, wherein the source and the drain are disposed on the intermediate dielectric layer and are electrically connected to the semiconductor pattern through the fourth contact via and the fifth contact via.

17. The touch panel as claimed in claim 16, wherein the gate insulation layer has a sixth contact via, the intermediate dielectric layer has a seventh contact via overlapped and connected with the sixth contact via, the transfer pattern is disposed on the intermediate dielectric layer and is electrically connected to the second end of the touch single line through the sixth contact via and the seventh contact via.

18. The touch panel as claimed in claim 14, wherein the transfer pattern and the source are constructed from a same film layer.

19. The touch panel as claimed in claim 14, wherein the transfer pattern and the gate are constructed from a same film layer.

20. A touch panel, comprising:
a first substrate, having an active region;
a plurality of touch electrodes, disposed on the active region of the first substrate;
a first insulation layer, covering the touch electrodes;
a plurality of touch signal lines, disposed on the first insulation layer, wherein each of the touch signal lines is electrically connected to one corresponding touch electrode, and the first insulation layer is located between the touch signal lines and the touch electrodes;
a plurality of active components, disposed on the first insulation layer, wherein each of the active components comprises a source, a gate, a gate insulation layer and a drain;
a plurality of scan lines, respectively electrically connected to the gates of the active components;
a plurality of data lines, respectively electrically connected to the sources of the active components; and
a plurality of conductive patterns, respectively electrically connected to the touch electrodes and respectively overlapped with the data lines.

21. A touch panel, comprising:
a first substrate, having an active region;
a plurality of touch electrodes, disposed on the active region of the first substrate, and each of the touch electrodes comprising a network structure, wherein the network structure has a solid portion and a plurality of opening portions defined by the solid portion;
a plurality of active components, wherein each of the active components comprises a semiconductor pattern, and the semiconductor pattern is substantially shielded by the solid portion of one corresponding touch electrode;
a first insulation layer, located on the first substrate and the touch electrodes, wherein the active components are disposed on the first insulation layer;
a second insulation layer, disposed on the active components;
a plurality of pixel electrodes, disposed on the second insulation layer and respectively electrically connected to the active components, wherein each of the pixel electrodes is overlapped with at least one opening portion of one corresponding touch electrode;
a plurality of touch signal lines, disposed on the first insulation layer and respectively electrically connected to the touch electrodes;
a third insulation layer, disposed on the touch signal lines, wherein the active components are disposed on the first insulation layer and the third insulation layer stacked with each other, wherein the third insulation layer has a first contact via disposed on the corresponding touch signal line and a second contact via disposed outside the corresponding touch signal line, the first insulation layer has a third contact via overlapped and connected with the second contact via; and
a conductive pattern, disposed on the third insulation layer, and electrically connected between the corresponding touch signal line and the touch electrode through the first contact via, the second contact via and the third contact via.

22. The touch panel as claimed in claim 21, wherein each of the active components further comprises a source, a gate, a gate insulation layer and a drain, the gate insulation layer is disposed between the gate and the semiconductor pattern and covers the third insulation layer.

23. The touch panel as claimed in claim 22, wherein the gate and the conductive pattern are constructed from a same film layer.

24. A touch panel, comprising:
a first substrate, having an active region;
a plurality of touch electrodes, disposed on the active region of the first substrate, and each of the touch electrodes comprising a network structure wherein the network structure has a solid portion and a plurality of opening portions defined by the solid portion;
a plurality of active components, wherein each of the active components comprises a semiconductor pattern, and the semiconductor pattern is substantially shielded by the solid portion of one corresponding touch electrode;
a first insulation layer, located on the first substrate and the touch electrodes, wherein the active components are disposed on the first insulation layer;
a second insulation layer, disposed on the active components;
a plurality of pixel electrodes, disposed on the second insulation layer and respectively electrically connected to the active components, wherein each of the pixel electrodes is overlapped with at least one opening portion of one corresponding touch electrode;
a plurality of touch signal lines, disposed on the first insulation layer and respectively electrically connected to the touch electrodes;
a third insulation layer, disposed on the touch signal lines, wherein the active components are disposed on the first insulation layer and the third insulation layer stacked with each other, wherein each of the active components further comprises a source, a gate, a gate insulation layer and a drain, and the gate insulation layer is disposed between the gate and the semiconductor pattern and covers the third insulation layer;

an intermediate dielectric layer, covering the gate, and having a fourth contact via and a fifth contact via, wherein the source and the drain are disposed on the intermediate dielectric layer and are respectively electrically connected to the semiconductor pattern through the fourth contact via and the fifth contact via; and a conductive pattern, disposed on the intermediate dielectric layer, and electrically connected between one of the touch electrodes and one of the touch signal lines.

25. A touch panel, comprising:

a first substrate, having an active region;

a plurality of touch electrodes, disposed on the active region of the first substrate, and each of the touch electrodes comprising a network structure, wherein the network structure has a solid portion and a plurality of opening portions defined by the solid portion;

a plurality of active components, wherein each of the active components comprises a semiconductor pattern, and the semiconductor pattern is substantially shielded by the solid portion of one corresponding touch electrode;

a first insulation layer, located on the first substrate and the touch electrodes, wherein the active components are disposed on the first insulation layer;

a second insulation layer, disposed on the active components;

a plurality of pixel electrodes, disposed on the second insulation layer and respectively electrically connected to the active components, wherein each of the pixel electrodes is overlapped with at least one opening portion of one corresponding touch electrode;

a plurality of touch signal lines, disposed on the first insulation layer and respectively electrically connected to the touch electrodes, wherein the first substrate further has a periphery region outside the active region, a first end of each of the touch signal lines is electrically connected to one corresponding touch electrode, and a second end of each of the touch signal lines is located on the periphery region;

a third insulation layer, disposed on the touch signal lines, wherein the active components are disposed on the first insulation layer and the third insulation layer stacked with each other;

a transfer pattern, located on the periphery region and disposed on the third insulation layer, wherein the transfer pattern is electrically connected to one of the touch signal lines; and a pad, disposed on the second insulation layer and electrically connected to the one of the touch signal lines through the transfer pattern.

26. The touch panel as claimed in claim 25, wherein the pad and the pixel electrodes are constructed from a same film layer.

* * * * *